United States Patent
Chin et al.

(10) Patent No.: US 10,412,193 B2
(45) Date of Patent: Sep. 10, 2019

(54) USAGE-AWARE STANDBY SERVICE IN A GRID ENVIRONMENT

(71) Applicant: INTERNATIONAL BUSINESS MACHINES CORPORATION, Armonk, NY (US)

(72) Inventors: Alicia E. Chin, Ontario (CA); Zhimin Lin, Ontario (CA); Hao Zhou, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 15/368,109

(22) Filed: Dec. 2, 2016

(65) Prior Publication Data

US 2018/0159956 A1    Jun. 7, 2018

(51) Int. Cl.
    *H04L 29/08*     (2006.01)
    *H04L 12/911*     (2013.01)

(52) U.S. Cl.
    CPC ............ *H04L 67/327* (2013.01); *H04L 67/10* (2013.01); *H04L 67/32* (2013.01); *H04L 47/82* (2013.01)

(58) Field of Classification Search
None
See application file for complete search history.

(56) References Cited

U.S. PATENT DOCUMENTS

| | | | |
|---|---|---|---|
| 8,095,620 B2 | 1/2012 | Rom et al. | |
| 8,631,403 B2* | 1/2014 | Soundararajan | ...... G06F 9/5077 718/1 |
| 8,671,409 B2 | 3/2014 | Spata | |
| 9,069,610 B2 | 6/2015 | Chakravorty et al. | |
| 9,774,489 B1* | 9/2017 | Gupta | ...................... H04L 67/34 |
| 9,929,969 B1* | 3/2018 | Krottapalli | .............. H04L 47/70 |
| 2004/0064548 A1* | 4/2004 | Adams | .................. G06F 9/5072 709/224 |
| 2006/0048161 A1* | 3/2006 | de Rose | ................ G06F 9/5072 718/105 |
| 2006/0064698 A1* | 3/2006 | Miller | ....................... G06F 9/50 718/104 |
| 2008/0256603 A1* | 10/2008 | Belgaied | ................. H04L 63/08 726/3 |
| 2009/0187658 A1* | 7/2009 | Williams | ................ H04L 67/02 709/226 |

(Continued)

OTHER PUBLICATIONS

Khooa et al., A Multi-Dimensional Scheduling Scheme in a Grid Computing Environment, p. 660, Jan. 2007 URL:http://himiko.dnsalias.net/wordpress/wp-content/uploads/2010/03/jpdc_2007_article_published.pdf.

(Continued)

*Primary Examiner* — Thomas J Dailey
(74) *Attorney, Agent, or Firm* — Michael R. Long; Robert Sullivan

(57) ABSTRACT

A technique for operating a grid includes receiving, by a resource manager executing on a data processing system of the grid, an allocation request from a first application for one or more resources. The resource manager determines whether a service that is in standby mode is available for utilization by the first application. In response to the service that is standby mode being available for utilization by the first application, the resource manager assigns one or more resources associated with the service and the service to the first application.

20 Claims, 7 Drawing Sheets

(56) References Cited

U.S. PATENT DOCUMENTS

| | | | |
|---|---|---|---|
| 2009/0276771 A1* | 11/2009 | Nickolov | G06F 9/4856 |
| | | | 717/177 |
| 2015/0149632 A1 | 5/2015 | Chin et al. | |
| 2015/0154056 A1* | 6/2015 | Chen | G06F 9/4856 |
| | | | 718/103 |
| 2015/0236973 A1 | 8/2015 | Jackson | |
| 2015/0277979 A1* | 10/2015 | Chen | G06F 9/5011 |
| | | | 718/104 |
| 2017/0293980 A1* | 10/2017 | Phillips | G06Q 40/08 |

OTHER PUBLICATIONS

Francisco et al., Semantics-Based Grid Resource Management, Nov. 2007 URL:https://www3.ime.usp.br/~kon/papers/mgc07-semantics.pdf.

* cited by examiner

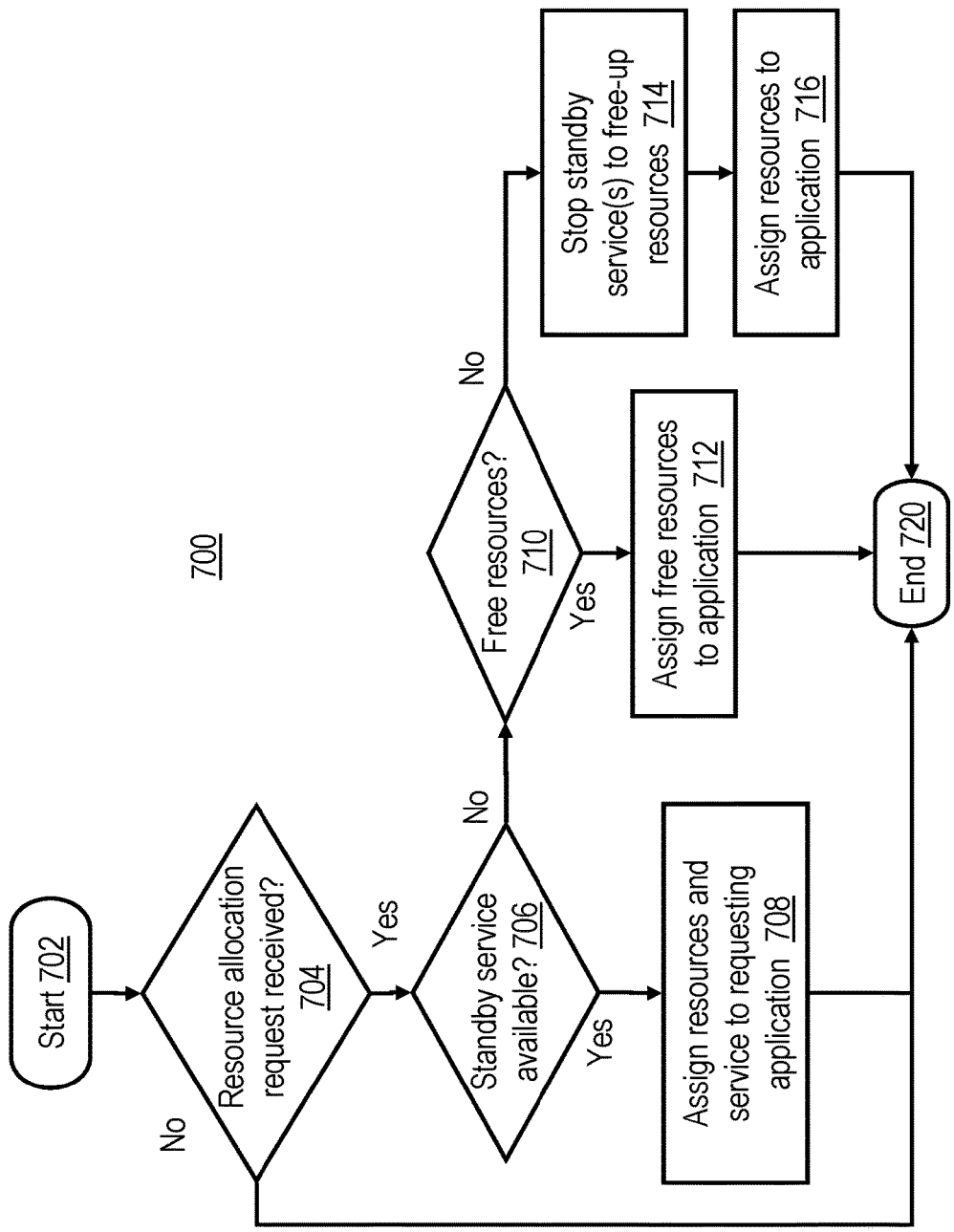

USAGE-AWARE STANDBY SERVICE IN A GRID ENVIRONMENT

BACKGROUND OF THE INVENTION

This disclosure relates to implementing standby services in a grid environment and, more specifically, to techniques for implementing a usage aware standby service with multidimensional scheduling in a grid environment.

Multi-dimensional scheduling refers to scheduling that offers improved resource utilization by increasing granularity in resource allocations for applications with varying resource requirements. In general, multi-dimensional scheduling facilitates multi-dimensional resource allocations, where each allocation request may specify a different amount of physical resources (e.g., central processing units (CPUs), processor cores, memory, and disks). In the context of software architecture, the term service refers to a software function or a set of software functions (e.g., that perform mathematical operations, retrieve specified information, or execute a set of operations) that may be reused and includes information or policies for using the service (e.g., based on the identity of a client requesting the service).

In a grid environment, applications typically share a group of resources according to an implemented resource sharing plan. In a typical grid environment, a resource manager allocates resources to an application when the application has demand and an implemented resource sharing plan entitles the application to the resources. A typical resource manager balances resources among applications when multiple applications are competing for the resources. Balancing resources may, for example, include reclaiming one or more resources from an application or moving one or more resources from one application to another application. Conventionally, resource balancing has involved stopping one or more services that were utilizing one or more resources and then starting one or more new services on the one or more resources. In cases where a service can be shared by different applications or reused by a single application and the initialization of the service is expensive, stopping the service may not be desirable.

Software systems with standby service features, that allow an application to release one or more resources while placing an associated service that was utilizing the resources in a standby mode, are known. In those known software systems, placing a service in standby mode facilitates reducing overhead associated with restarting the service (e.g., loading the service into memory) when an application that is allocated one or more resources reuses the service. In the event that an application cannot reuse a service that is in standby mode, a resource manager has to choose whether to leave the service in standby mode or to stop the service. If a resource manager leaves a service in standby mode, the service can potentially be reused when an application that originally used the service (or another application that requires the service) executes. However, leaving a service in standby mode may overload a machine (e.g., a machine may run out of available memory), especially when multiple services are placed in standby mode. On the other hand, if a service is stopped a service reuse level is reduced and overhead associated with restarting the service is increased.

BRIEF SUMMARY

A technique for operating a grid includes receiving, by a resource manager executing on a data processing system of the grid, an allocation request from a first application for one or more resources. The resource manager determines whether a service that is in standby mode is available for utilization by the first application. In response to the service that is standby mode being available for utilization by the first application, the resource manager assigns one or more resources associated with the service and the service to the first application.

The disclosed techniques may be implemented as a method, a data processing system, and/or a program product (including program code stored in a storage device).

BRIEF DESCRIPTION OF THE SEVERAL VIEWS OF THE DRAWINGS

FIG. 7 is a high level logical flowchart of an exemplary process that is executed by a resource manager to implement a usage aware standby service in accordance with one or more embodiments of the present disclosure.

DETAILED DESCRIPTION

Figure 1:
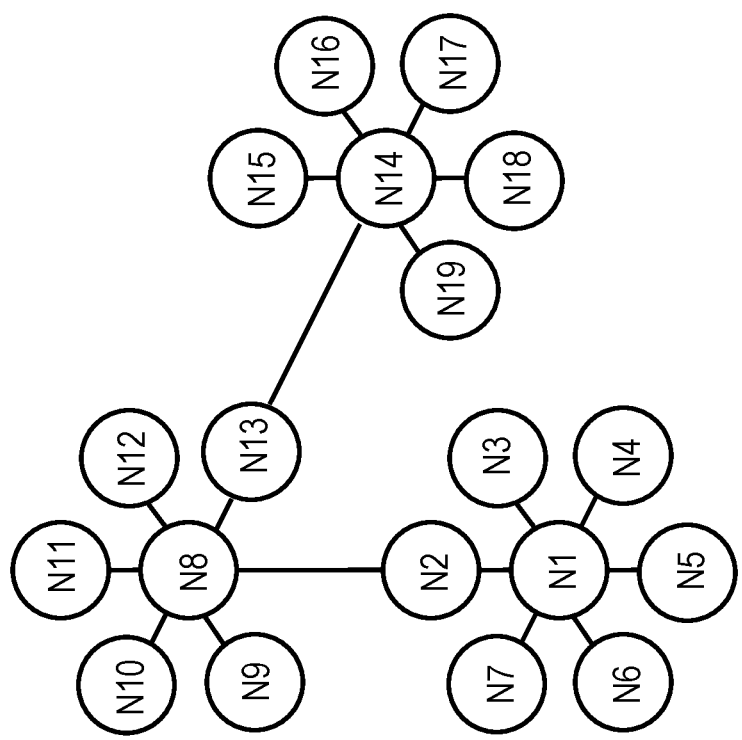
FIG. 1 is a diagram of an exemplary high performance computing (HPC) cluster or grid that includes a number of nodes, with one of the nodes including a resource manager that manages one or more usage aware standby services configured according to the present disclosure.

Platform Symphony™ is a high-performance computing (HPC) software system/grid computing software system that is designed to deliver scalability and enhance performance for compute-intensive applications. Platform Symphony supports distributed computing in which users may run applications without knowledge of where the applications reside or whether there is enough available capacity to support demand. Platform Symphony allows an application to release resources and keep an associated service available by placing the service in a local standby mode. As a service in Platform Symphony that is in local standby mode is not counted as using system resources, the service may potentially overload system resources (e.g., memory). Moreover, a service in Platform Symphony that is in local standby mode cannot be shared by another application and cannot support multi-dimensional scheduling.

An application using Platform Symphony can also release resources and keep an associated service available by placing the service in a global standby mode. The service can then be reassigned to the application or be assigned to another application that requires use of the service. However, a service in the global standby mode occupies the same amount of resources when the service is in global standby mode as when the service is executing, and, as such, none of the resources associated with the service can be reallocated to another application that uses a different service without stopping the service that is in global standby mode. Platform Symphony also cannot control the scope of applications that can use a service in global standby mode and does not support multi-dimensional scheduling.

Based on a recursive workload backfill feature of Platform Symphony, when a parent task is waiting for the result of a child task one or more resources the parent task is utilizing become idle and the child task may be scheduled to utilize one or more of the idle resources associated with the parent task (referred to as a nested backfill). However, resource usage of the parent task when using the recursive workload backfill feature is not accounted for and may cause overloading of system resources when a nested backfill occurs. Moreover, only child tasks (or further descendants in the same application) can backfill a service using the recursive workload backfill feature.

Vertically scaling resource usage of an executing service instance allows a service to release partial resources, when the service is not in full operation, to facilitate resource sharing. Vertically scaling resource usage of an executing service instance also allows a service to extend resource allocation when a workload for the service increases. However, vertically scaling resource usage of an executing service instance does not allow the service instance to be shared by another application.

Implementing a general service pool requires the number/type of services to be preconfigured and does not facilitate scheduling of the services by a resource manager and/or automatically balancing resource usage.

Implementing a caching system allows different parties to access a cache and share data via cache keys. However, a service that is managed by a resource manager may require multiple different resources (e.g., central processing units (CPUs), memory, disk space, and licenses, etc.) while caching systems only apply to memory or disk space.

According to one or more aspects of the present disclosure, a resource manager is made aware of resource usage of a service when the service is in standby mode to facilitate improved resource management. It should be appreciated that a service in standby mode normally uses less resources than when the service is in full operation mode. As one example, a service may use zero central processing units (CPUs) when the service is not executing a workload while still occupying an originally allocated amount of memory. According to the present disclosure, a resource manager may make better decisions, regarding whether a service should be stopped or left in standby mode, when an application provides the resource manager with CPU and memory usage associated with the service when the service is in standby mode.

According to aspects of the present disclosure, a usage aware standby service (UASS) is created by an application. According to one or more embodiments of the present disclosure, when an application decides to release one or more resources and a service on the resources may later be reused (by the application or another application), the application releases at least some of the resources and places the service in a usage aware standby mode. According to one or more embodiments of the present disclosure, a UASS is tagged by a creating application (creator) with resource usage information that indicates resources utilized by the UASS when the UASS is in standby mode. According to other aspects of the present disclosure, a UASS is also tagged with a service scope that indicates what applications can reuse the UASS. For example, a UASS may have a 'global' scope (which means any application can reuse the service), a 'user' scope (which means an application that logs on as a same user as the creator may reuse the service), or any other scope that is defined for a resource manager.

According to another aspect, a UASS is tagged by the creator with a 'type' that allows a potential consumer of the service to search for the UASS. A UASS may also be tagged with some metadata that stores information on how to reuse the service (e.g., by specifying a transmission control protocol (TCP) listening port number that is to be used, etc.). A UASS can also be tagged with a start-up cost associated with restarting operation of the UASS. In this case, a UASS whose start-up cost is the lowest may be stopped first in the event that a UASS has to be stopped to provide resources to an application.

According to one or more aspects of the present disclosure, a resource manager is configured to manage the life of a UASS based on available resources in an associated grid and an implemented resource sharing plan (which may, for example, be configured by an administrator of the grid). According to one or more embodiments, when an application that is requesting resources can reuse a UASS that is in standby mode, a resource manager may allocate resources occupied by the UASS and the UASS, as well as other resources, to the application. As one example, one or more additional resources that are required to execute the UASS may be allocated from a host in which resources the UASS occupies in standby mode are located.

According to another aspect, when an application requests resources and there are not enough free resources available and at least some resources are occupied by a UASS, the resource manager may be configured to free some (or all) resources that are utilized by the UASS and assign those freed resources to the requesting application. In one or more embodiments, when a UASS belongs to a party that owns the resources on which the UASS executes, the resource manager may be configured to not stop the UASS for an application that is owned by another party that is requesting resources. In this case, the application owned by another party is required to locate resources elsewhere.

Implementing a UASS configured according to the present disclosure advantageously facilitates handling multiple use cases (that have conventionally required separate solutions) using only parameter changes. As one example, parameters for a UASS reported by an application to a resource manager may specify a 'resource usage' and a 'scope'. In an exemplary first use case (Case1), an application completes a workload and desires to release one or more allocated resources to a resource manager, so that other applications can utilize the released resources. In the first use case, the application, however, does not want to stop an associated UASS as restarting the UASS is expensive. In the first use case, only the application that releases the resource can reuse the UASS. In the first use case, a reported 'resource usage' parameter indicates only memory resources are utilized by the UASS when the UASS is in standby mode and a 'reported scope' parameter indicates that only the releasing application can reuse the UASS.

In an exemplary second use case (Case2), an application either finishes a workload or was required, by a resource manager, to release one or more allocated resources. In the second use case, the application also does not want to stop an associated UASS, as restarting the UASS is expensive. In the second use, case, the application that releases the resources and/or other applications can reuse the UASS. In the second use case, the application places the UASS in standby mode and the resource manager can stop the UASS on demand when memory is in short supply. In the second use case, a reported 'resource usage' parameter indicates that only memory is utilized by the UASS in standby mode and a 'reported scope' parameter indicates that the releasing application and applications within a specified scope can reuse the UASS. In the second use case, the scope of applications that can reuse the UASS can be global, limited to a user, or limited to any customized scope.

In an exemplary third use case (Case3), a borrowing application is using one or more resources that are reclaimed by a lending application that must be released within a given grace period. In the third use case, the lending application has a dynamic workload that may complete before the grace period expires, at which point the resources do not need to be reclaimed and may be retained by the borrowing application. Assuming the borrowing application can retain the resources it is desirable for a UASS that was running on the borrowed resources to being restarted without initialization. In the third use case, if the resources were released to the resource manager before the end of grace period, the borrowing application places the UASS in standby mode. In the third use case, the UASS is stopped if the borrowed resources are reallocated to another application. However, in the third use case, when the resources are allocated back to the borrowing application the UASS can resume without initialization. In the third use case, a reported 'resource usage' parameter indicates that resources are retained by the borrowing application when the lending application does not need the resources following the grace period and a 'reported scope' parameter indicates that only the borrowing application can reuse the UASS.

With reference to FIG. 1, an exemplary topology for a relevant portion of an exemplary HPC cluster (grid) 100 includes a number of nodes (N1-N18) that are connected in, for example, a three-dimensional (3D) Torus topology. Each of the nodes (N1-N18) may include one or more symmetric multiprocessors (SMPs), in addition to other resources (memory, disk space, etc.). While eighteen nodes are illustrated in FIG. 1, it should be appreciated that more or less than eighteen nodes may be present in a grid configured according to the present disclosure and that each of the nodes may include the same or different resources. It should be appreciated that allocation of the resources of the grid 100 are controlled by a resource manager that receives allocation requests from various applications (not shown in FIG. 1). It should also be appreciated that a number of different clients (not shown) may request execution of different ones of the applications that may execute within grid 100.

Figure 2:
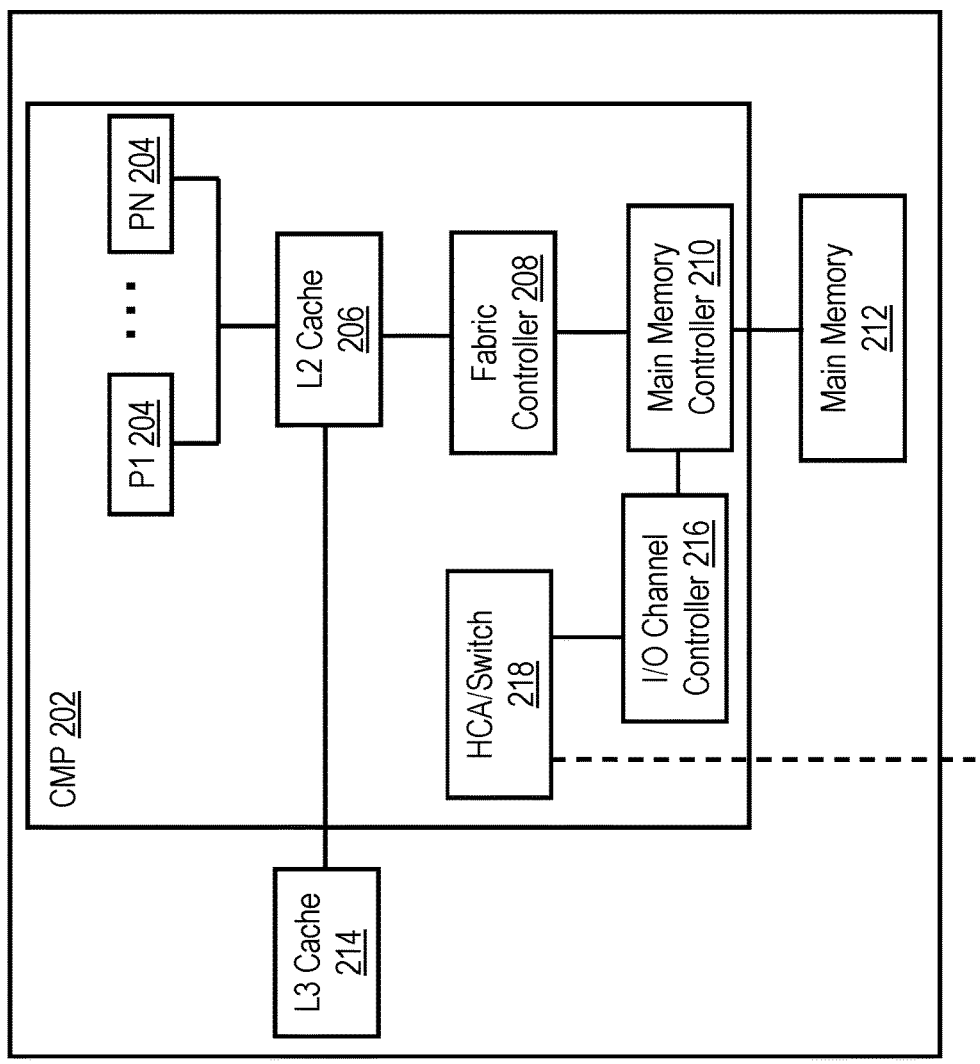
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200 and/or other resources. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of grid 100.

Figure 3:
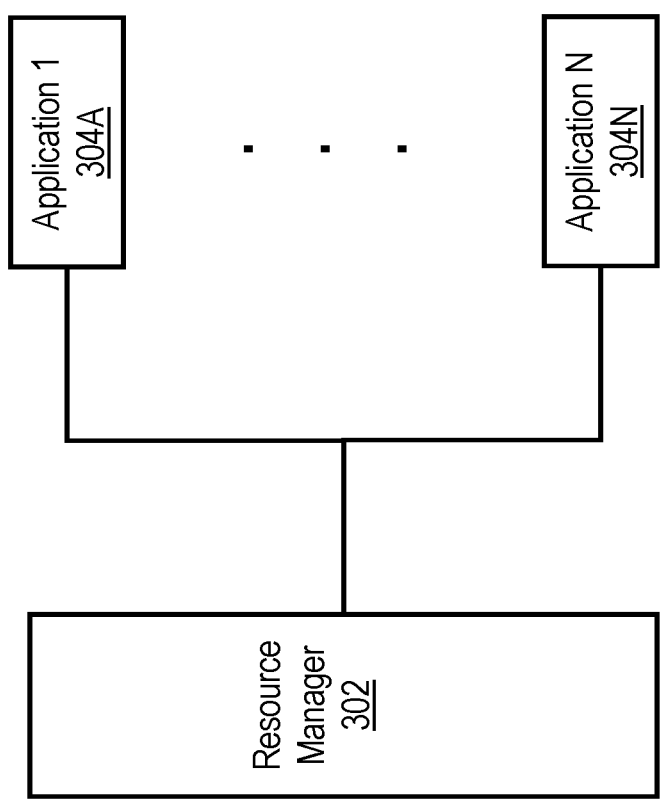
FIG. 3 is a diagram illustrating a resource manager communicating with multiple applications configured to implement one or more usage aware standby services, according to an embodiment of the present disclosure.

FIG. 3 illustrates a resource manager 302 in communication with multiple applications 304. Resource manager 302 responds to allocation requests received from applications 304 and may reclaim resources from one or more applications 304 and reassign resources allocated to the one or more applications 304 to another application 304, based on available resources in grid 100 and an implemented resource sharing plan, according to the present disclosure. As previously mentioned, resource manager 302 and applications 304 execute on resources of grid 100.

According to one or more aspects of the present disclosure, a usage aware standby service (UASS) that may be reused by an application is tagged with resource usage information that indicates resources utilized by the UASS when the UASS is in a standby mode. The UASS may also be tagged with scope information that indicates applications that can reuse the UASS. The UASS may be tagged with type information that allows a potential consumer of the UASS to search for the UASS. The UASS may also be tagged with a cost of restarting the UASS in the event the UASS is stopped. In one embodiment, a UASS with a lowest cost of restarting is stopped first. In one or more embodiments, metadata may be stored that provides information on how to reuse the resource. In various embodiments, a resource manager manages a life of each UASS based on resources available in an associated grid and a resource sharing plan configured by an administrator.

In one embodiment, when an application requesting resources can reuse a UASS, a resource manager allocates resources for the application from a host where the UASS is maintained in standby mode. In another embodiment, when there are not enough free resources available for an application that is requesting resources and resources are occupied by the UASS the resource manager may stop a predetermined portion of the UASS to free resources for the application requesting resources. In one or more other embodiments, when the scope of the UASS belongs to an entity that owns the resources of the UASS, the resource manager is configured to not stop the UASS when an application not associated with the entity requests resources.

Figure 4:
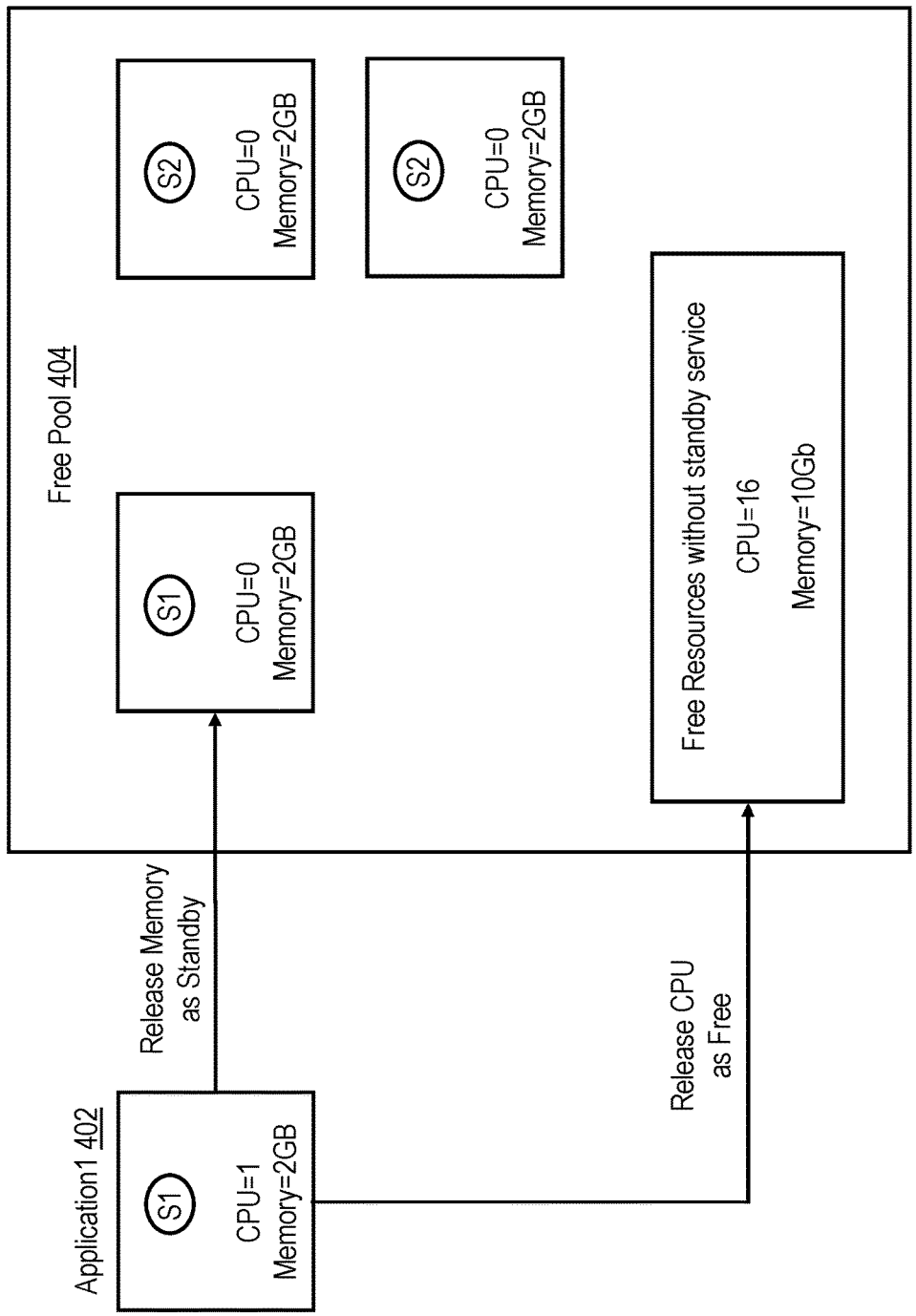
FIG. 4 is a diagram illustrating an application that utilizes a usage aware standby service releasing one or more resources to a free pool, according to an aspect of the present disclosure.
Figure 5:
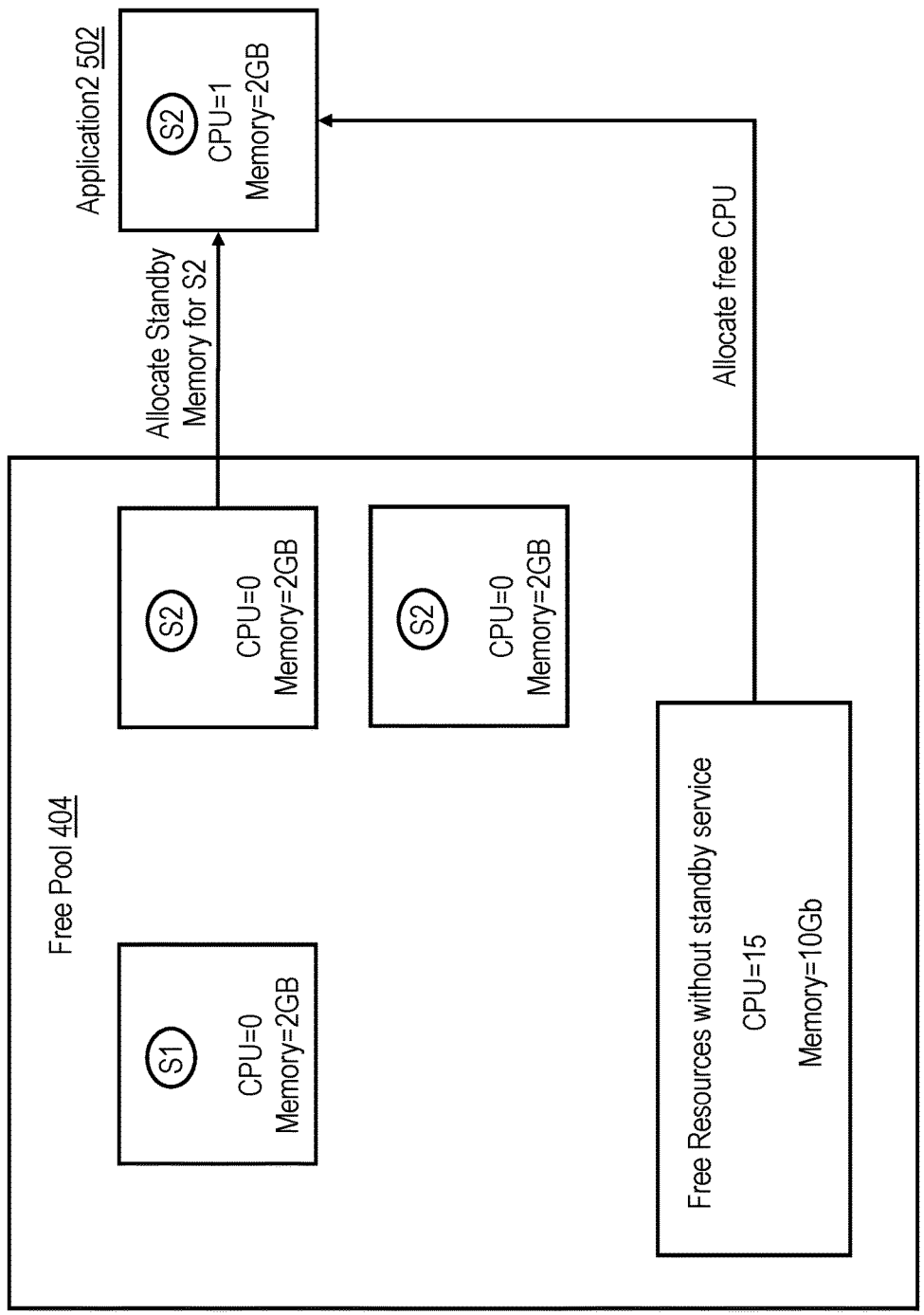
FIG. 5 is a diagram illustrating an application that utilizes a usage aware standby service receiving a resource allocation from a free pool, according to an aspect of the present disclosure.
Figure 6:
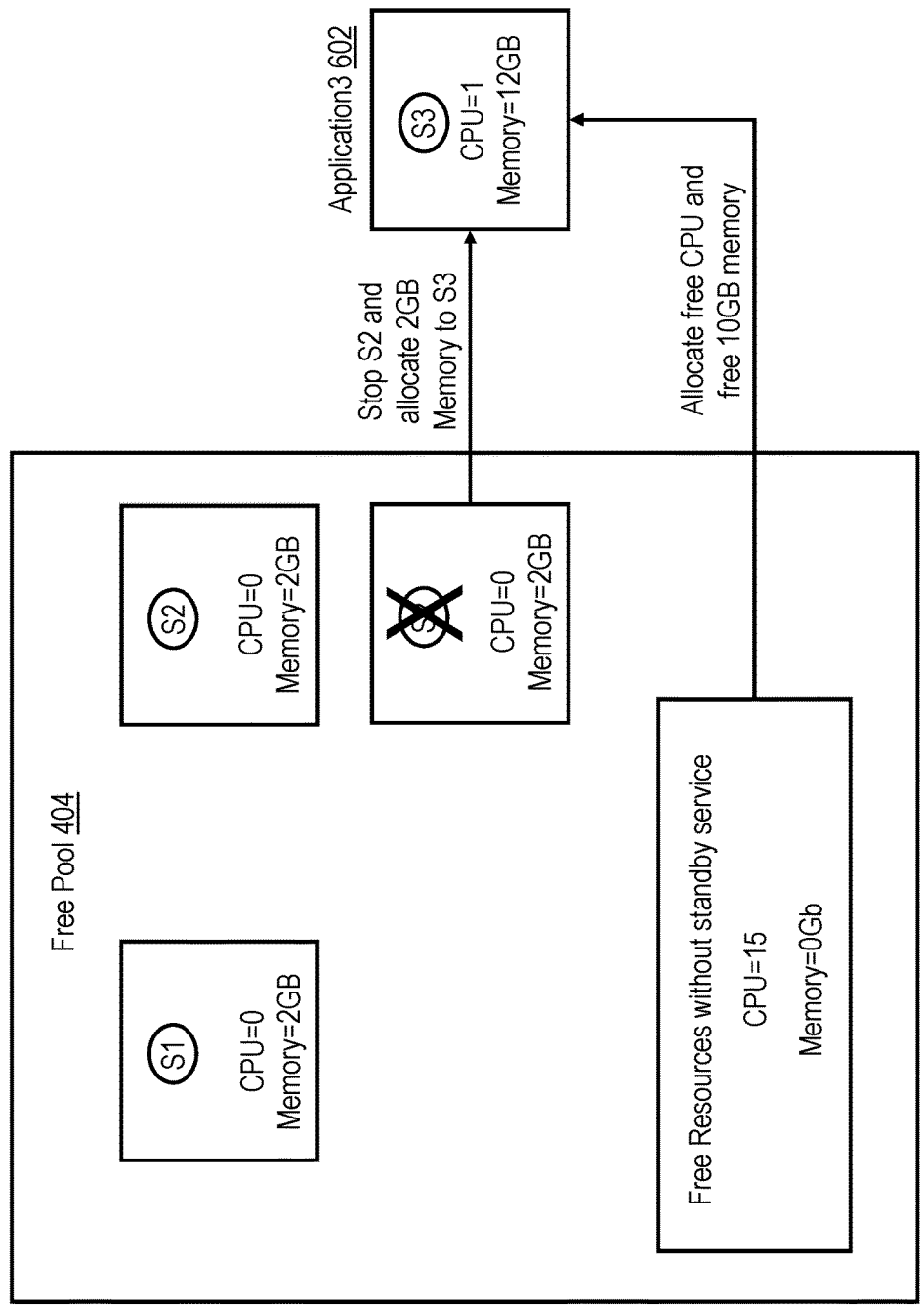
FIG. 6 is a diagram illustrating an application receiving resources from a free pool in which available usage aware standby services cannot be utilized and a usage aware standby service is stopped (as available resources without standby services are not sufficient to meet resource requirements of the application), according to another aspect of the present disclosure.

FIGS. 4-6 are applicable to a system that includes sixteen CPUs and 16 GB of memory. With reference to FIG. 4, a first application (Application1) 402 is executing a first service (S1), has one allocated CPU (CPU=1), and 2 GB of allocated memory (memory=2 GB). First application 402 has completed an associated workload and has released resources associated with the first service (S1) while specifying a 'resource usage'. Specifically, first application 402 has released (as free) its allocated CPU (i.e., CPU=1) to free pool 404 and has released (as standby) memory allocated to the first service (S1) while in standby mode to free pool 404. As is also shown, free pool 404 also includes two instances of a second service (S2), each of which requires 2 GB of memory while in standby mode and zero CPUs. As such, free pool 404 includes sixteen available CPUs and 10 G of available memory that can be allocated to other applications without stopping the first service (S1) or one or both of the two instances of the second service (S2).

With reference to FIG. 5, a second application (Application2) 502 is illustrated as receiving resource allocations from free pool 404 for an instance of a second service (S2) that is being reused. Specifically, second application 502 is being allocated one free CPU (CPU=1), and 2 GB of standby memory (memory=2 GB) associated with a first instance of the second service (S2). As is also shown, free pool 404 also includes one instance of the first service (S1) and a second instance of the second service (S2), each of which is allocated 2 GB of memory while in standby mode and zero CPUs. Following resource allocation to second application 502, free pool 404 includes fifteen available CPUs and 10 G of available memory that can be allocated to other applications without stopping the first service (S1) or the second instance of the second service (S2).

With reference to FIG. 6, a third application (Application3) 602 is illustrated as receiving resource allocations from free pool 404 for an instance of a second service (S2) that is being stopped. Specifically, third application 602 is being allocated one free CPU (CPU=1), and 12 GB of memory (memory=12 GB). In this case, 10 GB of the free memory is allocated and 2 GB of the memory is allocated from a second instance of the second service (S2) which is stopped. As is also shown, free pool 404 also includes one instance of the first service (S1) and a first instance of the second service (S2), each of which is allocated 2 GB of memory while in standby mode and zero CPUs. Following resource allocation to third application 602, free pool 404 includes fifteen available CPUs and 0 GB of available free memory that can be allocated to other applications without stopping the first service (S1) or the first instance of the second service (S2). In FIG. 6, third application 602, while receiving memory allocated to the second instance of the second service (S2) cannot reuse the second service (S2).

With reference to FIG. 7, a process 700 is illustrated that is executed by resource manager 302. Process 700 is initiated in block 702 in response to resource manager 302 receiving a communication, e.g., from a first application 304A. Next, in decision block 704, resource manager 302 determines whether the communication is a resource allocation request from first application 304A. In response to the communication not being a resource allocation request from first application 304A control transfers from block 704 to block 720, where process 700 terminates. In response to the communication being a resource allocation request control transfers from block 704 to decision block 706.

In block 706, resource manager 302 determines whether there is a standby service that is available to service the resource allocation request. As one example, assuming first application 304A requests a first service (S1) and resources for the first service and the first service are in standby mode and available to first application 304A (i.e., a service scope of the first service includes first application 304A) then resource manager 302 may assign resources for the first service and any other required resource to first application 304A. For example, if the first service requires 2 GB of memory and one CPU for full operation and the first service has 2 GB of memory in standby mode and zero CPUs in standby mode then resource manager 302 may assign one CPU from free pool 404 and the 2 GB of standby memory associated with the first service from free pool 404 to first application 304A.

In response to there being a standby service available to service the resource allocation request from first application 304A control transfers to block 708. In block 708, resource manager 302 assigns resources and the standby service (including its associated resources) to first application 304A. Following block 708 control transfers to block 720. In response to there not being a standby service available to service the resource allocation request from first application 304A control transfers from block 706 to decision block 710. As one example, a standby service may not be available to service the resource allocation request from first application 304A even when a standby service is the same as the requested service when first application 304A is not within a scope of the standby service (e.g., the first service is only available to a second application 304B). As another example, the first service many not currently be in standby mode.

In block 710, resource manager 302 determines whether there are free resources to service the allocation request from application 304. In response to there being free resources in free pool 404 to service the allocation request from application 304 control transfers from block 710 to block 712. As one example, application 304 may request 4 GB of memory and two CPUs and free pool 404 may have 10 GB of free memory and 4 free CPUs. In block 712 resource manager 302 assigns the requested resources to application 304. Following block 712 control transfers to block 720.

In response to there not being free resources in free pool 404 to service the allocation request from application 304 in block 710 control transfers to block 714. As one example, application 304 may request 4 GB of memory and two CPUs and free pool 404 may only have 2 GB of free memory and two free CPUs. In block 714 resource manager 302 stops one or more standby services to free-up resources (e.g., resource manager 302 may stop standby services with lower start-up costs first), assuming there are standby services that can be stopped. Next, in block 716, resource manager 302 assigns the requested resources to application 304. Following block 716 control transfers to block 720.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, a controller of a non-volatile memory array retires physical pages within the non-volatile memory array on a page-by-page basis. The physical pages retired by the controller include a first physical page sharing a common set of memory cells with a second physical page. While the first physical page is retired, the controller retains the second physical page as an active physical page, writes dummy data to the first physical page, and writes data received from a host to the second physical page.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of operating a grid computing environment, said method comprising:
    executing, on at least one host data processing system of the grid computing environment, a plurality of applications of at least one grid client and a resource manager that allocates resources of the grid computing environment among the plurality of applications;
    a first application among the plurality of applications creating a service, utilizing the service, and thereafter placing the service in standby mode for reuse, wherein placing the service in standby mode includes the first application tagging the service with scope information indicating which of the plurality of application can reuse the service and releasing at least some resources allocated to the service by the resource manager while retaining at least some resources allocated to the service by the resource manager;
    the resource manager, responsive to receiving an allocation request from a second application among the plurality of applications, determining whether the scope information of the service indicates that the second application can reuse the service that is in standby mode; and
    in response to determining the service that is standby mode can be reused by the second application, the resource manager assigning one or more resources associated with the service and the service to the second application.

2. The method of claim 1, further comprising:
    determining, by the resource manager, whether free resources are available to be assigned to the second application; and
    in response to determining the service in standby mode cannot be reused by the second application and free resources are not available to be assigned to the second application, stopping, by the resource manager, the service and assigning, by the resource manager, at least some resources previously utilized by the service in the standby mode to the second application.

3. The method of claim 1, and further comprising the first application tagging the service with resource usage information that indicates which resources are utilized by the service when the service is in the standby mode.

4. The method of claim 1, and further comprising the first application tagging the service with type information that allows a consumer of the service to search for the service.

5. The method of claim 4, and further comprising the first application tagging the service with reuse information that facilitates reuse of the service.

6. The method of claim 1, and further comprising:
    in response to determining the service in standby mode can be reused by the second application, assigning, by the resource manager, all resources for the second application from a same host data processing system in the grid computing environment that includes the one or more resources for the service.

7. A grid computing environment, comprising:
    allocable resources including processors and memory; and
    at least one host data processing system configured to execute a plurality of applications including a first application and a second application and a resource manager for managing the allocable resources, wherein the first application is configured to perform:
        creating a service, utilizing the service, and thereafter placing the service in standby mode for reuse, wherein placing the service in standby mode includes the first application tagging the service with scope information indicating which of the plurality of application can reuse the service and releasing at least some resources allocated to the service by the resource manager while retaining at least some resources allocated to the service by the resource manager
    wherein the resource manager is configured to perform:
        allocating the resources of the grid computing environment among a plurality of applications, including at least a first application and a second application;
        responsive to receiving an allocation request from a second application, determining whether the scope information of the service indicates that the second application can reuse the service that is in standby mode; and
        in response to determining the service that is standby mode can be reused by the second application, assigning one or more resources associated with the service and the service to the second application.

8. The grid computing environment of claim 7, wherein the resource manager is further configured to perform:
    determining whether free resources are available to be assigned to the second application; and
    in response to determining the service in standby mode cannot be reused by the second application and free resources are not available to be assigned to the second application, stopping the service and assigning at least some resources previously utilized by the service in the standby mode to the second application.

9. The grid computing environment of claim 7, wherein the second application is further configured to perform tagging the service with resource usage information that indicates which resources are utilized by the service when the service is in the standby mode.

10. The grid computing environment of claim 9, wherein the first application is further configured to perform tagging the service with type information that allows a consumer of the service to search for the service.

11. The grid computing environment of claim 10, wherein the first application is further configured to perform tagging the service with reuse information that facilitates reuse of the service.

12. The grid computing environment of claim 7, wherein the resource manager is configured to perform:
    in response to the service in standby mode can be reused by the second application, assigning all resources for the second application from a same host data processing system in the grid computing environment that includes the one or more resources for the service.

13. A computer program product, the computer program product comprising a computer readable storage medium having program instructions embodied therewith, the program instructions executable by a processor, to cause the processor to perform:
    executing, on at least one host data processing system of the grid computing environment, a resource manager that allocates resources of the grid computing environment among a plurality of applications of at least one grid client, the plurality of applications including at least a first application and a second application;
    the first application creating a service, utilizing the service, and thereafter placing the service in standby mode for reuse, wherein placing the service in standby mode includes the first application tagging the service with scope information indicating which of the plurality of application can reuse the service and releasing at least some resources allocated to the service by the resource manager while retaining at least some resources allocated to the service by the resource manager;
    the resource manager, responsive to receiving an allocation request from a second application among the plurality of applications, determining whether the scope information of the service indicates that the second application can reuse the service that is in standby mode; and
    in response to determining the service that is standby mode can be reused by the second application, the resource manager assigning one or more resources associated with the service and the service to the second application.

14. The program product of claim 13, wherein the program instructions executable by the processor, are further configured to cause the processor to perform:
    determining whether free resources are available to be assigned to the second application; and
    in response to determining the service in standby mode cannot be reused by the second application and free resources are not available to be assigned to the second application, stopping, by the resource manager, the service and assigning, by the resource manager, at least some resources previously utilized by the service in the standby mode to the second application.

15. The program product of claim 14, wherein the program instructions executable by the processor, are further configured to cause the processor to perform:
    tagging, by the first application, the service with resource usage information that indicates which resources are utilized by the service when the service is in the standby mode.

16. The program product of claim 14, wherein the program instructions executable by the processor, are further configured to cause the processor to perform:
    tagging, by the application, the service with type information that allows a consumer of the service to search for the service.

17. The program product of claim 14, wherein the program instructions executable by the processor, are further configured to cause the processor to perform:
    in response to determining the service in standby mode can be reused by the second application, assigning, by the resource manager, all resources for the second application from a same host data processing system in the grid computing environment that includes the one or more resources for the service.

18. The method of claim 1, wherein the scope information has at least a first setting that restricts reuse of the service to those of the plurality of applications having a same associated grid client as the first application and a second setting that does not restrict reuse of the service to those of the plurality of applications having the same associated grid client as the first application.

19. The grid computing environment of claim 7, wherein the scope information has at least a first setting that restricts reuse of the service to those of the plurality of applications having a same associated grid client as the first application and a second setting that does not restrict reuse of the service to those of the plurality of applications having the same associated grid client as the first application.

20. The program product of claim 13, wherein the scope information has at least a first setting that restricts reuse of the service to those of the plurality of applications having a same associated grid client as the first application and a second setting that does not restrict reuse of the service to those of the plurality of applications having the same associated grid client as the first application.

* * * * *